United States Patent [19]

Sanner

[11] 3,888,275
[45] June 10, 1975

[54] FLUID FLOW SYSTEMS
[75] Inventor: George E. Sanner, Sparks, Md.
[73] Assignee: Santron Corporation, Towson, Md.
[22] Filed: Nov. 6, 1973
[21] Appl. No.: 413,255

Related U.S. Application Data
[60] Continuation-in-part of Ser. No. 322,384, Jan. 10, 1972, Pat. No. 3,809,116, which is a division of Ser. No. 272,793, July 18, 1972, Pat. No. 3,848,616, which is a continuation-in-part of Ser. No. 18,829, March 12, 1970, abandoned, which is a division of Ser. No. 456,787, May 18, 1965, Pat. No. 3,500,844.

[52] U.S. Cl. ................................................ 137/391
[51] Int. Cl. ............................................. E03b 11/16
[58] Field of Search ........... 137/386, 391, 392, 393; 73/336.5; 200/61.05, 200; 307/118; 239/65, 70, 63; 4/172, 172.17

[56] References Cited
UNITED STATES PATENTS
3,181,557   5/1965   Lannan, Jr. ......................... 137/391
3,759,286   9/1973   Page .................................. 137/392

Primary Examiner—Henry T. Klinksiek
Assistant Examiner—David R. Matthews
Attorney, Agent, or Firm—Strauch, Nolan, Neale, Nies & Kurz

[57] ABSTRACT

Systems for controlling the flow of fluid in any one of a plurality of selectable flow patterns including one in which mixing of two fluids can be effected.

12 Claims, 1 Drawing Figure

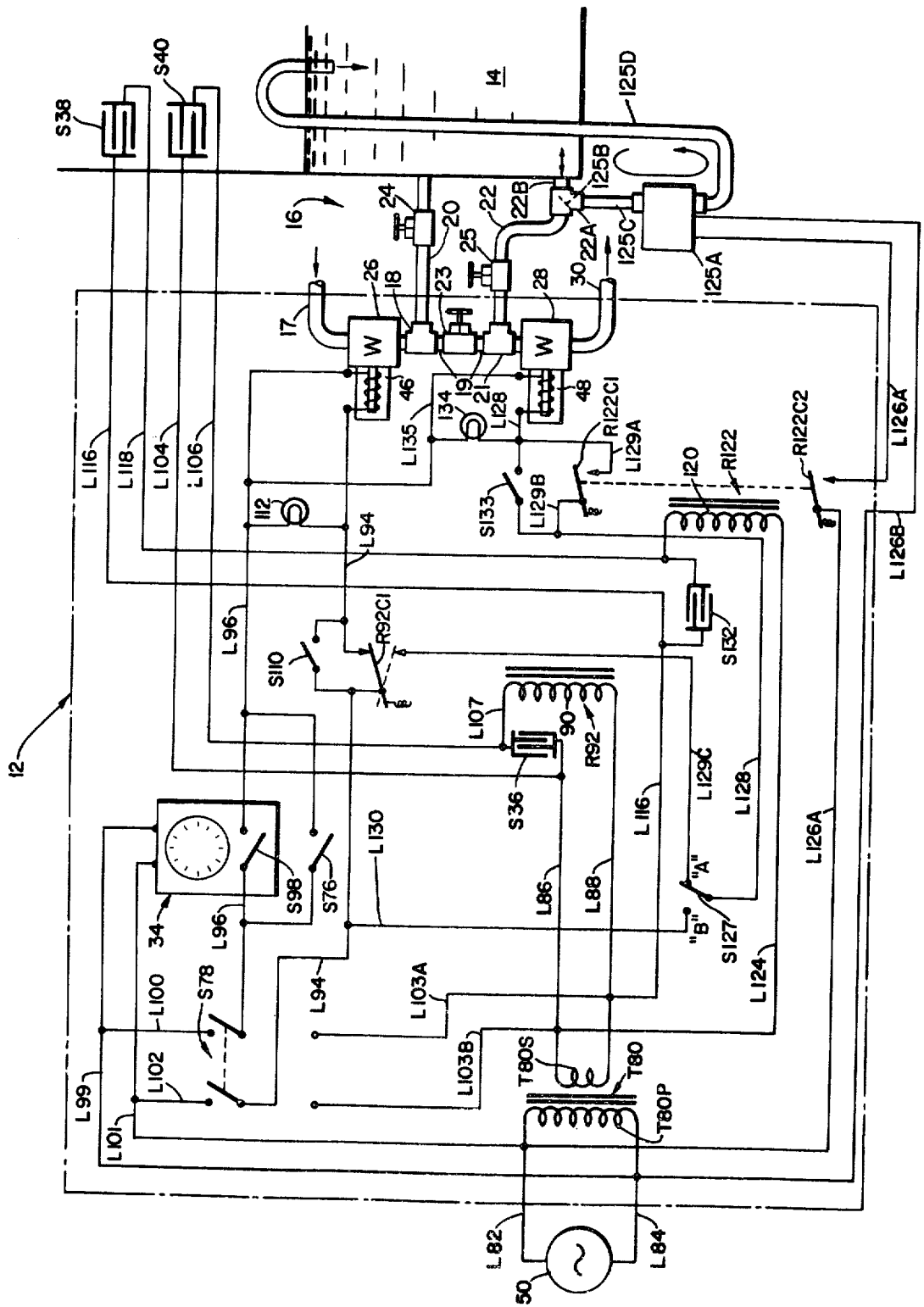

FLUID FLOW SYSTEMS

This application is a continuation-in-part of application No. 322,384 filed Jan. 10, 1973 (now U.S. Pat. No. 3,809,116). Application Ser. No. 322,384 is a division of application Ser. No. 272,793 filed July 18, 1972 (now U.S. Pat. No. 3,848,616). The latter is a continuaton-in-part of application Ser. No. 18,829 filed Mar. 12, 1970 (now abandoned), which is a division of application Ser. No. 456,787 filed May 18, 1965 (now U.S. Pat. No. 3,500,844).

The present invention relates primarily to novel, improved systems for the flow of fluids.

Numerous fluid flow systems have heretofore been proposed for various purposes. U.S. Pat. Nos. 3,613,714; 3,233,619; 3,118,606; 3,599,666; 2,588,677; 2,488,817; 3,344,651; 3,111,017; 3,359,766; 3,362,427; 2,213,961; and 2,708,945 all disclose systems in which provision is made for discontinuing liquid flow when some predetermined condition is achieved. However, systems of this type heretofore known have a number of disadvantages as discussed in parent application Ser. No. 322,384.

Another and preeminent disadvantage of many known fluid flow systems is their lack of flexibility. Typically, only one or at most a very few flow patterns are provided except in large and complex systems which are unsuitable or economically unjustifiable in many instances.

It is the primary object of the present invention to provide novel, improved fluid flow systems which are relatively simple and inexpensive and yet have a high degree of flexibility and versatility.

Another important and related object of the present invention resides in the provision of fluid flow systems in accord with the preceding object which have the advantages of those disclosed in patent application Ser. No. 322,384.

Additional objects, further novel features, and other advantages of the present invention will become more fully apparent from the appended claims and from the ensuing detailed description and discussion as it proceeds in conjunction with the accompanying drawing which is a schematic illustration of a fluid flow system in accord with the principles of the present invention.

The fluid flow control system depicted in the drawing includes a master control unit 12 for automatically controlling the flow of fluid into and from a receptacle or reservoir 14 and through a system of conduits and valves identified collectively by reference character 16.

System 16 includes a supply conduit 17 which is communicatable with receptacle 14 through tee 18, conduit 19, and either: (a) conduit 20, or (b) tee 21 and a conduit 22 connected from the tee to tank 14 through tee 22A and conduit 22B.

Valves 23, 24, and 25 interposed in conduits 19, 20, and 22, respectively, can be opened and closed in varying combinations to alter the pattern of fluid flow through system 16. Further control over the flow is exercised by an electromagnetically actuated valve 26 in conduit 17 and a valve 28 of similar character in an output or discharge conduit 30 which is connected to flow conduits 19 and 22 by tee 21.

Unit 12 controls the flow of fluid through system 16 by effecting the opening and closing of valves 26 and 28 at the appropriate times and for the proper lengths of time. The major components of the control unit include a timer 34, a planimetric, condition responsive switch S36, and maximum and minimum level control, planimetric switches S38 and S40 located in receptacle 14. The timer and planimetric switches are electrically connected to the electromagnetic actuators or solenoids 46 of valve 26 and 48 of valve 28 and to a power source 50.

Depending upon which of the valves 23, 24, 25, 26, and 28 are open, a wide variety of flow patterns can be obtained. The most important of these are shown in the following table.

| | Valve 23 | Valve 24 | Valve 25 | Valve 26 | Valve 28 | Flow Pattern |
|---|---|---|---|---|---|---|
| 1 | C | O | O | O | C | Fluid enters receptacle 14 from conduit 17 via conduit 20 |
| 2 | C | O | O | C | O | Fluid flows from receptacle 14 into conduit 30 via conduit 22 |
| 3 | C | O | O | O | O | Flow into and from receptacle 14 as described in entries 1 and 2 occurs simultaneously |
| 4 | O | C | O | O | C | Fluid flows into tank 14 from conduit 17 via conduit 22 |
| 5 | O | C | O | C | O | Fluid from tank 14 flows into conduit 30 via conduit 22 |
| 6 | O | C | O | O | O | Fluid from conduit 17 mixes with fluid exiting from tank 14 in conduit 30 |

C = closed
O = open

In the mode of operation shown by the last entry in Table 1, fluids flowing through conduits 19 and 22 can be combined and mixed in tee 21 and conduit 30. This makes the system useful in, for example, the mixing of industrial chemicals such as paints and electrolytes.

There are of course combinations of open and closed valves in which there will be no flow at all in system 16. Also, by only partially opening different ones of the three valves 23, 24, and 25, various flows can be proportioned between conduits. This even further increases the versatility of the system.

One (or both) of the two electrically actuated valves 26 and 28 must be open for there to be flow in system 16. The flow will occur within the predetermined time interval set by timer 34 unless an automatic mode switch S76 is closed to bypass the timer. Then flow will occur upon demand by either or both of the planimetric switches S38 and S40.

Control over fluid flow by valves 26 and 28 during the intervals determined by timer 34 is referred to as a "timed" mode of operation. The alternate mode of operation with switch S76 closed, in which the timer is bypassed and switches S38 and S40 are operative at all times to control flow, is referred to as a "demand" or "automatic" mode of operation.

A second switch S78 permits solenoids 46 and 48 to be operated on either high voltage from primary T80P of transformer T80 or low voltage from the transformer secondary T80S. This extends the versatility of the system as the solenoid controlled valves may be selected on the basis of either high current/low voltage or low current/high voltage, depending upon the application of the flow control system.

The voltage present at source 50 (typically, 110–120 volt, 60 cycle, AC) is applied through conductors L82 and L84 to the primary T80P of transformer T80. A low voltage is generated across the secondary coil T80S and applied via conductors L86 and L88 to solenoid coil 90 of relay R92 which is connected in series with the parallel combination of planimetric switch S36 and minimum level planimetric switch S40.

Solenoid coil 46 is energized to open valve 26 and effect flow through conduit 17 into tank 14 or tee 21 and conduit 30 by voltage applied via conductors L96 and L94 through contact R92C1 of relay R92 and timer switch S98 from switch S78. Thus, switches S36 and S40 control the opening and closing of valve 26 by virtue of the control they exercise over relay R92.

High voltage for solenoid 46 is obtained at switch S78 from the primary of transformer T80P via conductors L99, L100, L101, and L102 while low voltage is obtained from transformer secondary T80S via conductor L103A and L103B.

Solenoid coil 46 is energized and valve 26 is opened when switch S98 is closed and relay contact R92C1 is in the position shown in full lines. This occurs with the solenoid coil 90 of relay R92 deenergized.

With valve 26 open and valves 23, 24, 25, and 28 positioned as indicated in entries 1, 3, and 4 of Table 1, fluid flows from conduit 17 into receptacle 14 until the planimetric, minimum level switch S40 is closed by the rising fluid in the receptacle. This causes relay R92 to be energized as it permits current to flow from transformer secondary T80S through conductor L86, conductor L104, switch S40, leads L106 and L107, relay solenoid coil 90, and conductor L88 back to the transformer secondary.

When relay R92 is energized, contactor R92C1 transfers to the position shown in dotted lines and breaks the continuity in conductor L94, interrupting current flow through solenoid coil 46 and causing valve 26 to close. The flow of liquid from conduit 17 into receptacle 14 consequently ceases.

As planimetric switch S36 is connected in parallel with minimum level planimetric switch S40 across transformer secondary T80S, closing of this switch will also cause cessation of flow through conduit 17. The closing of planimetric switch S36 causes relay coil 90 to be energized, thereby transferring contact R92C1 to the dotted line position and interrupting the continuity in conductor L94. This deenergizes solenoid coil 46 and causes valve 26 to close.

If the fluid level in receptacle 14 has not reached the minimum level planimetric switch S40 and switch S36 reopens, flow through conduit 17 will resume until either planimetric switch S40 is reached by the rising fluid or the timing interval determined by timer 34 is completed and timer switch S98 opens, interrupting the continuity in lead L96.

Planimetric override switch S36 can be made responsive to a variety of parameters, e.g., the presence of moisture in the environment in which it is located or the level of fluid in another receptacle or reservoir; or it can be replaced with a different type of sensing device responsive to pressure, mechanical movement, etc.

If "automatic" or "demand" switch S76 is closed to bypass timer switch S98, flow through conduit 17 will occur upon demand by planimetric switch S40 unless rejected by planimetric switch S36. Manual control over flow through conduit 17 may be experienced by closing switch S110 in addition to switch S76. Switch S110 bypasses relay contactor R92C1, and closing it will cause solenoid coil 46 of valve 26 to be energized.

If switch S110 is closed but switch S76 is left open, manual control over flow through conduit 17 can still be exercised, but only within the period determined by timer 34.

An indicator light 112 is connected across conductors L94 and L96. It therefore lights when solenoid coil 46 is energized and indicates that flow through conduit 17 is occurring.

Referring again to the drawing, flow through discharge conduit 30 from conduit 17 or tank 14 is, in certain modes of operation, controlled by maximum level planimetric switch S38. When the level of the fluid in receptacle 14 reaches maximum level planimetric switch S38 and the switch closes, current flows from transformer secondary T80S through conductors L88 and L116, switch S38, conductor L118, solenoid coil 120 of relay R122, and conductors L124 and L86 to secondary coil T80S. This energizes relay R122, closing contactor R122C1 and permitting current to energize solenoid 48 of valve 28 through one of the circuits discussed below. This causes the valve to open.

Fluid then flows from receptacle 14 through conduit 22, tee 21, and valve 28 into conduit 30 and/or from conduit 17 into the discharge conduit, depending upon the settings of valves 23, 24, and 25.

As the fluid in receptacle 14 may not be under pressure, a pump 125 is typically incorporated in system 16; and relay R122 is equipped with a second contactor R122C2.

When contactor R122C1 closes, the second contactor R122C2 also closes. With contactor R122C2 closed, voltage is supplied to pump 125A through leads L82, L126A and L126B, L84. This energizes the pump which places fluid in conduit 22 under pressure. When flow ceases, pump 125A stops as contactor R122C2 opens, interrupting the continuity in lead L126A.

An adjustable diverter 125B in tee 22A allows pump 125A to recirculate a selected portion of the fluid flowing through conduit 22B through conduits 125C and 125D back into tank 14. This is useful, for example, in insuring that fluid added to tank 14 from conduit 17 is kept mixed with material already in or otherwise added to the tank as the mixture is removed via conduit 22.

As heretofore indicated, flow under the control of valves 26 and 28 can be effected independently or simultaneously. This versatility is attributable to the unique manner in which solenoid 48 of valve 28 is energized through relay R92; viz., by sequence switch S127, which has two operating positions. In switch position A, one of the two flow controlling valves 26 and 28 is caused to remain closed while the other of the valves is open because operating voltage cannot be applied at the same time to both valve-operating solenoids 46 and 48. Thus, with switch S127 in position A, fluid can flow from conduit 20 into tank 14, or fluid can flow from tank 14 into conduit 30. However, simultaneous flow through both conduits 19 and 22 into tee 21 and conduit 30 cannot occur.

Specifically, with relay R92 energized and contact R92C1 in the dotted line position, operating voltage for solenoid 48 of valve 28 is taken from switch S78 via conductors L96, L135, L128, L129A, relay contactor R122C1 and leads L129B and L128 to sequence switch S127. In position A, the return to switch S78 is via leads L129C, relay contactor R92C1 and lead L94, thus making voltage available to solenoid 48 to open valve 28 only when both relays R92 and R122 are energized.

However, with switch S127 in the A position and relay R92 energized, operating voltage cannot be applied to solenoid 46 to energize it and open valve 26. The return path for this solenoid is through lead L94 which has continuity only when solenoid R92 is deenergized.

Conversely, when relay R92 is deenergized and the return path from solenoid 46 is completed to open valve 26, valve 28 cannot open because the transfer of contact R92C1 to the full line position interrupts the continuity between leads L129C and L94 in the return to switch S78 from solenoid 48.

In position B of switch S127, the circuit from solenoid 48 is returned to switch S78 via conductor L130, which bypasses relay R92. Flow under the control of valve 26 and under the control of valve 28 can occur at the same time because the energization of solenoid 48 becomes independent of the operation of relay R92. That is, with switch S127 in position B, valve solenoid 46 and valve 26 are under the control of only relay R92; and solenoid 48 and valve 28 are similarly under the control only of relay R122, which is actuated independently of relay R92.

Simultaneous flow will occur only if switches S36 and S40 are both open to deenergize relay R92 and energize solenoid 46 and switch S38 is closed to energize relay R122 and solenoid 48. This will not necessarily occur so that, with the sequence switch in positin B, flow under the control of valve 28 can also occur without flow under the control of valve 26 and vice versa, depending upon the response of switches S36, S38, and S40 to the conditions they are employed to detect.

It is with switch S127 in position B that fluid from reservoir 14 can be combined or mixed with fluid from conduit 19 in tee 21 and conduit 30 and removed via conduit 30.

An auxiliary planimetric switch S132 permits flow from tank 14 into conduit 30 to be continued after planimetric switch S38 opens by keeping relay R122 energized until the switch opens. This switch, which is connected in parallel with switch S38 across leads L116 and L118, even further increases the capabilities of the novel systems disclosed herein by providing an override on switch S38.

As in the case of planimetric switch S36, switch S132 can be made responsive to a variety of parameters or replaced with a condition responsive circuit operator of different construction.

As switch S132 is connected in parallel with switch S38, operation under the control of this switch is the same as under the control of switch S38 as far as the relationship between inflow and outflow with sequence switch S127 in both of its positions A and B is concerned.

In the cases described so far, flow from tank 14 under the control of valve 28 is limited to the timing interval of timer 34 as solenoid 48 receives energy from the conductors L96 and L135 in series with timer switch S98. Fully automatic control is also available by closing switch S76, which bypasses timer switch S98. In the "automatic mode" outflow occurs when demanded by planimetric switches S38 and S132.

Outflow can be made to occur manually as well as automatically upon demand or within a given time period. This is accomplished by closing switch S133 in addition to switch S76. Switch S133 is connected around relay contactor R122C1 in lead L128. Accordingly, with switch S133 closed, solenoid 48 of valve 28 is connected to one side of high/low voltage switch S78 as described above. The return path is through lead L128, switch S133, switch S127, and leads L130 and L94 to switch S78. With switch S127 in the B position, outflow will occur until switch S133 is opened, independently of the opening and closing of valve 26, as switch S127 is then connected directly to the other side of switch S78 through leads L130 and L94.

With switch S133 closed and switch S127 in the A position, switch S127 is connected to switch S78 through relay contactor R92C1 as discussed above. Thus, with switch S127 in the A position and switch S133 closed, outflow will occur whenever flow under the control of valve 26 ceases and will continue until such flow resumes, giving still further versatility to the system.

Also, switch S133 can be closed and switch S76 left open. This permits manual control to be exercised over outflow but only during the period determined by timer 34.

An indicator lamp 134 is connected across leads S128 and L135 in parallel with solenoid 48. Accordingly, the lamp will be lighted whenever solenoid 48 is energized and outflow is occurring.

The extra dimension of control afforded by any of the switches, valves, etc., employed in the embodiment of the invention described above can be eliminated if unnecessary or not wanted by deleting or disabling the component which provides that control.

Also, it is to be understood that valves 23, 24, and 25 are shown only as manual valves simply as a matter of expediency. In many applications of the invention electromagnetically actuated valves such as those identified by reference characters 26 and 28 will instead be employed so that the valves can be adjusted automatically and/or at locations remote from the valve.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description; and all changes which come within the meaning and range of equivalents of the claims are therefore intended to be embraced therein.

What is claimed and desired to be secured by Letters Patent is:

1. A fluid flow system comprising first and second conduits; first and second flow effecting means for controlling flow through said conduits; and control means operable in one selectable mode to so regulate the operation of said flow effecting means as to limit flow through each of said conduits to periods in which there is no flow in the other of said conduits and in a second selectable mode to so regulate the operation of the flow effecting means as to make the flow through said conduits independent so that there may be effected through one or the other of said conduits only or through both of said conduits.

2. The system of claim 1, wherein the control means includes a condition responsive control component for regulating the operation of each of said flow effecting means and a selectively operable component for overriding each said condition responsive component and making the flowing effecting means with which the condition responsive component is associated manually regulatable.

3. The system of claim 2, together with a timer means for limiting the periods during which said flow effecting means can be actuated both by said condition responsive and said selectively operable components.

4. The system of claim 2, wherein the control means includes an additional condition responsive component for overriding the first-mentioned condition responsive component associated with each of said flow effecting means.

5. The fluid flow system of claim 1, wherein said first and second flow effecting means are electrically operated valves and wherein the control means regulates the opening and closing of said valves and includes a circuit element operable in said one mode of operation to connect the operator of one or the other of said valves only to an electrical power source, whereby one of said valves can be opened only when the other is closed and conductor means operable in said second mode of operation to connect the operator of the second valve to the power source around said circuit element, whereby said second valve can be opened and closed irrespective of whether the first valve is opened or closed, said system further including means for selecting the mode of operation of the control means which comprises a two-position switch operable in one position to connect the operator of the second valve in circuit with the circuit element only and in the second position to connect said operator in circuit with said conductor means only.

6. The fluid flow system of claim 5, together with timer means for limiting the period in which the first and second valves can be actuated and selectively operable means for bypassing said timer means so that said timer means will not influence the operation of said control means.

7. A fluid flow system including a receptacle: a first means for effecting a flow of fluid into said receptacle and a second means for effecting a flow of fluid out of said receptacle; and control means operable in one selectable mode to provide independent control over the operation of the first and second flow effecting means so that there may be effected flow into said receptacle, flow out of said receptacle, or simultaneous flow of fluid into and out of said receptacle and in a second selectable mode to so control the operation of said first and second flow effecting means that there can be only flow into said receptacle or flow out of said receptacle at any given time.

8. The system of claim 7, wherein the second flow effecting means includes a conduit means for fluid flowing out of the receptacle and means which is selectively operable to divert the fluid caused to flow by said first flow effecting means into said conduit means for combination with the fluid from the receptacle flowing therein.

9. The combination of a receptacle and means for controlling the flow of fluid to and from said receptacle which comprises first and second conduits connected in parallel to said receptacle; a third conduit connected between said first and second conduits; a supply conduit communicating with said first and second conduits; a discharge conduit communicating with said second and third conduits; and a plurality of valves which can be selectively and independently opened and closed to establish a selected pattern of the flow through said first, second, and third conduits.

10. The combination of claim 9, together with a further, separate valve for controlling flow through each of said supply and discharge conduits.

11. The combination of claim 10 together with means for effecting concurrent opening of those valves controlling the flow of fluid through said supply and discharge conduits so that a flow of fluid from said supply conduit and into said discharge conduit can be effected at the same time as a flow of fluid from said receptacle into said discharge conduit to thereby provide for the mixing of fluids from the supply conduit and from the receptacle in the discharge conduit.

12. The combination of a receptacle and means for controlling the level of liquid in said receptacle which comprises a first means for effecting a flow of liquid into said receptacle from a first source; a second means for effecting a flow of liquid out of said receptacle; and means for controlling the operation of said first and second flow effecting means, said last-mentioned means including means for interrupting the operation of said first flow effecting means and thereby terminating the flow of liquid into the receptacle while said receptacle is receiving liquid from a source other than said first source.

* * * * *